April 21, 1964     A. E. POLLOCK     3,129,521
APPARATUS FOR USE IN REMOVING PLANTS FROM THE SOIL
Filed Dec. 26, 1962

INVENTOR.
Allen E. Pollock
BY
ATTORNEYS.

United States Patent Office 3,129,521
Patented Apr. 21, 1964

3,129,521
APPARATUS FOR USE IN REMOVING PLANTS FROM THE SOIL
Allen E. Pollock, 3517 Holmes, Kansas City, Mo.
Filed Dec. 26, 1962, Ser. No. 247,241
4 Claims. (Cl. 37—2)

This invention relates to the transplanting of bushes, plants, trees and the like, and more particularly, to a device for removing such growth from the ground preparatory to planting the same elsewhere.

It is the primary object of the present invention to provide apparatus for removing plant growth from the earth for purposes of transplanting the same elsewhere, and wherein the root structure of the growth is substantially undisturbed throughout the removal operation so that the transplanted growth will continue to develop in a normal manner notwithstanding the fact that the same has been moved from its initial position.

Another object of the present invention is the provision of apparatus for use in the transplanting of plant growth wherein a column of soil containing the growth is severed at a location below the level of the earth by a single cutting action in a manner so as to preclude having to dig beneath the column and growth as has been heretofore required in transplanting operations. Thus, the time and effort normally expended for such growth removal operations is significantly reduced by the use of the structure of the present invention.

Still another object of the present invention is the provision of apparatus of the type described which may be placed in operation after a narrow trench has been dug in the soil about the growth to be transplanted, whereby the transplanting operation may be rendered substantially economical by the use of a conventional trench digging power unit, together with the structure of the present invention, notwithstanding the fact that the growth is readily placed in condition for movement elsewhere while remaining substantially intact.

Yet another object of this invention is the provision of apparatus of the character described wherein the column of earth containing the plant growth to be transplanted is sheared from the earth therebelow, while at the same time the column is maintained in a fixed position to thereby assure that only shearing action occurs to thereby maintain the root structure of the growth substantially intact.

A further object of the present invention is the provision of a fall which can be utilized for severing a column of earth containing plant growth to be transplanted, and wherein the fall may be provided with platform structure movable beneath the column so that the latter may be readily lifted from its initial location and moved to the site at which it is to be transplanted, all of which is accomplished without disturbing the growth above the soil, as well as its associated root structure below the level of the soil.

Other objects of this invention will become apparent as the following specification progresses, reference being had to the accompanying drawing, wherein.

The present invention is directed to structure for shearing a column of earth containing plant growth at a location spaced sufficiently below the level of the earth to preclude any substantial interference with the root structure of the growth. The present invention is removably placed in a trench disposed about the column, and a fall of flexible cable-like material is disposed about the column and then drawn in one direction through the column adjacent the base thereof so as to sever the column. Jack mechanism carried by the apparatus is coupled with the fall to initiate the shearing action thereof. The apparatus is provided with column-engaging means to prevent any substantial movement of the column while the same is being sheared from the earth.

One embodiment of the present invention utilizes hydraulic jack means for raising a vertically reciprocable section from a stationary or base section, the cable being coupled with the reciprocable section for movement therewith.

A second embodiment of the present invention utilizes a jack mechanism similar to a conventional automobile bumper jack comprised of a rack and detent means. The cable is directly connected with the portion containing the detent means to draw the fall through the column as the portion is elevated.

One embodiment of the plant growth severing apparatus forming the present invention is broadly denoted by the numeral 10 and includes a base section 12, a vertically reciprocable section 14 movable relative to base section 12, and jack mechanism 16 carried by base section 12 and coupled with reciprocable section 14 for shifting the latter.

Figure 1:
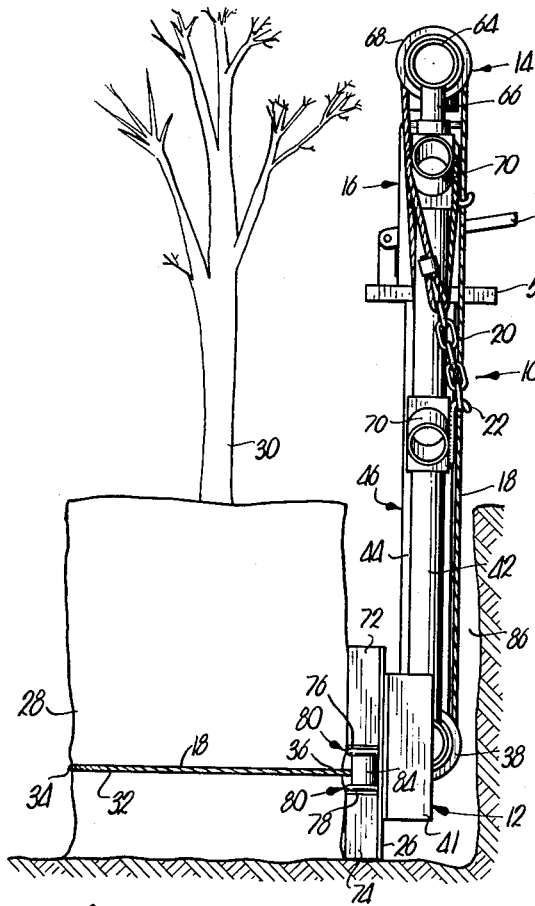
FIGURE 1 is an end elevational view of one embodiment of the apparatus forming the subject of the present invention and illustrating its use in severing a column of earth containing plant growth.

Sections 12 and 14 provide a support for an elongated, flexible cable 18 secured at the ends thereof to short lengths 20 of chain secured to base section 12 over hooks 22 as is clear in FIG. 1. Cable 18 passes through a pair of apertures 24 in a plate 26 and about a column 28 of earth containing plant growth 30 such as a tree or the like. The portion of cable 18 about column 28 presents a fall 32 having a bight 34, and a pair of running ends 36, the latter passing below and about sheaves 38 forming a part of a standing block 40 at the lower extremity of base section 12.

Figure 3:
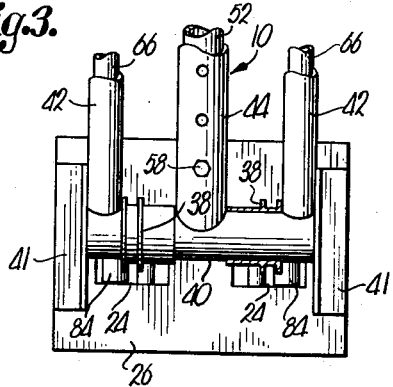
FIG. 3 is a fragmentary view of the lower extremity of the apparatus looking in the direction of the column.

Standing block 40 may take any general configuration, but the same may well be formed from tubular stock affixed to one face of plate 26 in any suitable manner such as by welding or the like. As shown in FIG. 3, a pair of angle irons 41 are secured to the ends of standing block 40 and to the corresponding face of plate 26. Block 40 is thus made rigid to plate 26 intermediate the normally uppermost and lowermost edges thereof. Block 40 is secured to a pair of parallel tubes 42 and to a rigid part 44 forming a portion of a standard broadly denoted by the numeral 46. Rigid part 44 is secured to tubes 42 by connecting braces 50 adjacent the open upper end of rigid part 44. An elongated, tubular member 52 is received within rigid part 44 and serves as a shiftable part for standard 46. Member 52 is rigid to the underside of base 54 of jack mechanism 16, the latter, therefore, being movable relative to rigid part 44. Member 52 is provided with an opening therein which may be alignable with any one of a number of vertically spaced openings 56 in rigid part 44. A bolt 58 is receivable within the openings 56 and the opening in member 52 aligned therewith so as to maintain rigid part 44 and member 52 in a substantially fixed position relative to each other.

Jack member 16 is preferably of the hydraulically actuated type having a lever 60 which is movable in a vertical plane to effect the raising of the jack shaft 62 coupled to the running block 64 forming a part of reciprocable section 14. Block 64 may preferably be in the nature of a tube or the like which interconnects a pair of elongated elements 66, the latter being telescopically received within the open tops of tubes 42. It is seen that as jack shaft 62 is raised, elements 66 move out of tubes 42 to thereby raise running block 64. Block 64 is provided with sheaves 68 thereon which are aligned with sheaves 38 on block 40.

A number of outwardly extending horns 70 are rigid to each tube 42 in spaced relationship thereto. Horns 70 provide anchors about which cable 18 may be disposed.

A pair of vertically spaced blocks 72 and 74 are secured to the face of plate 26 opposite to the face on which angle irons 41 are secured. Blocks 72 and 74 are disposed above and below respectively, the apertures 24 in plate 26. An upper plate 76 is disposed directly beneath block 72 and secured to the corresponding face of plate 26. Similarly, a plate 78 is disposed directly above block 74 and secured to the corresponding face of plate 26. A pair of U-shaped, rod-like devices 80 are rigid to plates 76 and 78 and are provided with bights 82 in outwardly spaced relationship to the corresponding face of plate 26. Bights 82 are substantially flush with the plane of the vertical surfaces of blocks 72 and 74. Bights 82 serve as guides for cable 18. A pair of rollers 84 are disposed in spanning relationship between plates 76 and 78 and receive therebetween the corresponding stretch of cable 18. Rollers 84 effectively guide cable 18 as the latter is shifted under the action of mechanism 16.

In operation, a trench 86 is initially dug about growth 30 so as to form column 28. Apparatus 10 is then disposed in the trench 86 with block 74 resting on the earth forming the bottom of trench 86. Cable 18 is disposed about column 28 so that bight 34 is in the position illustrated in FIG. 1, and the ends of the cable 18 are secured by lengths 20 to hooks 22.

As lever 60 is reciprocated in a vertical plane jack mechanism 16 is actuated so as to elevate jack shaft 62. This in turn raises running block 64 to force elements 66 out of tubes 42. Cable 18, having been initially disposed over sheaves 68 and rigid to hooks 22, is shifted by the upward movement of running block 64 so as to move fall 32 through column 28 and thus to sever the latter. In fact, mechanism 16 exerts a pull on cable 18 so as to constrict the bight 34 to in turn draw the same through column 28.

Cable 18 being rove over sheaves 38 and 68 is drawn upwardly to thereby force bight 34 along a horizontal path through column 28, it being noted that the lower extremities of sheave 38 are horizontally aligned with the line along which it is desired to sever column 28.

Figure 2:
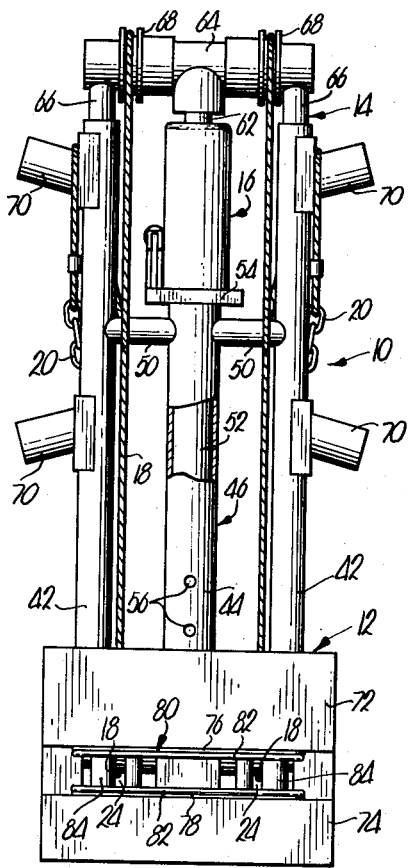
FIG. 2 is a side elevational view of the apparatus looking in a direction away from the column, parts being broken away and in section to illustrate details of construction.

Blocks 72 and 74 are at all times in engagement with column 28 to prevent any movement of the latter while fall 32 is severing column 28. Thus, while the cable is being pulled through column 28, blocks 72 and 74 provide a push against column 28. If it is desired to decrease the size of fall 32, the ends of cable 18 may be wrapped and anchored about one or more of the horns 70 so as to take up the additional slack. As shown in FIGS. 1 and 2, each end of cable 18 passes over the upper of the horns 70 on each tube 42, then downwardly and about the corresponding brace 50, then upwardly, over and downwardly from the corresponding sheave 68. In addition, member 52 may be raised with respect to rigid part 44 to change the position of jack mechanism 16 with respect to plate 26. This is accomplished of course, by re-aligning the opening in member 52 with another of the openings 56 in rigid part 44 and placing bolt 58 in the aligned openings.

It is preferred that trench 86 be dug deep enough so as to not interfere substantially with any of the essential root structure of growth 30. Motorized trenching machines may be utilized for digging trench 86 so as to render the operation of removing growth 30 with apparatus 10 substantially more economical than the growth removal operations heretofore employed. In this respect, a platform, rigid or flexible, may be affixed to bight 34 so as to be drawn into a position beneath column 28 as the latter is being severed from the earth. Thus, the column 28 and the growth 30 may be effectively lifted out of trench 86 and moved to the site of transplanting.

Apparatus 10 may be constructed from inexpensive materials which are commercially available.

Fall 32 provides an effective flexible cutting element for removing a large variety of different types of plant growth therefrom for transplanting purposes. Mechanism 16, cable 18, and sheaves 38 and 68 provide an efficient multiple purchase block and tackle structure for severing the column of earth.

Figures 4, 5:
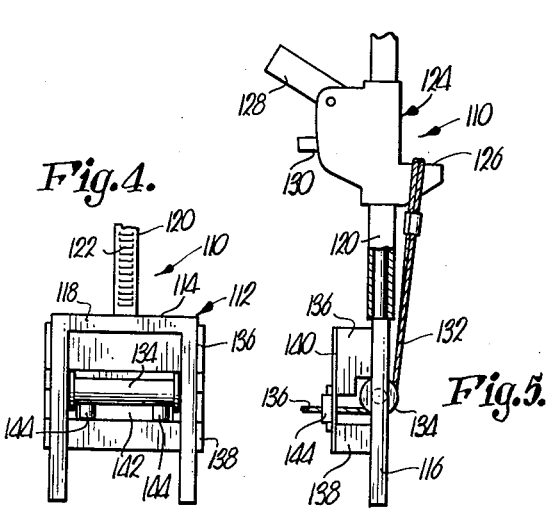
FIG. 4 is a fragmentary, side elevational view of a second embodiment of the present invention looking in the direction of the column with which the same is to be utilized for removing the column.
FIG. 5 is an end elevational view of the embodiment of FIG. 4 and showing the mechanism for effecting the shearing action to sever the column.

A second embodiment of the apparatus of the present invention is illustrated in FIGS. 4 and 5 and is broadly denoted by the numeral 110. Apparatus 110 includes a support 112 having a U-shaped base section 114, and a generally upwardly extending member 116 secured to the bight 118 of base section 114.

Member 116 is telescopically received within a tubular element 120 having rack means 122 on one face thereof for engagement with detent means (not shown) carried by a jack mechanism 124. Element 120 and mechanism 124 may well form the parts of a conventional automobile bumper jack which is provided with a bumper engaging ledge 126 and a lever 128 for raising ledge 126 relative to element 120. A reversing device 130 coupled with the detent means permits the reversing action of mechanism 124.

A flexible cutting element 132 in the nature of an elongated cable, is provided with apparatus 110, the ends of element 132 being looped over and secured to ledge 126 as is clear in FIG. 5. Element 132 being looped over and secured to ledge 126 as is clear in FIG. 5. Element 132 is normally disposed beneath a roller 134 forming a standing block and secured between the sides of U-shaped base section 114. Element 132 then passes between a pair of vertically spaced blocks 136 and 138 secured in any suitable manner to base section 114. A plate 140 secured to the outer faces of blocks 136 and 138 is provided with a central aperture 142 therein for permitting the passage of element 132 therethrough. A pair of spaced rollers 144 are carried by plate 140 for guiding the running ends 146 of element 132, the latter being disposed for encircling a column of earth in the same manner as fall 32 of apparatus 10.

In operation, apparatus 110 is disposed in a trench in the same manner as apparatus 10. Element 132 is caused to encircle the column of earth to be severed at the line at which it is desired to sever the column from the earth. Actuation of mechanism 124 by swinging lever 128 in a vertical plane is sufficient to elevate ledge 126 to in turn move the ends of element 132 upwardly. This action tends to constrict the fall formed by the portion of element 132 extending outwardly from plate 140. The column of earth is, therefore, severed after mechanism 124 has traveled upwardly a distance equal to the distance required to cause the fall to pass completely through the column.

One advantage of the embodiment of FIGS. 4 and 5 is that the same may be disassembled for storage purposes by simply removing element 120 from member 116. Element 132 may be readily threaded through or removed from the aperture 142 of plate 140 for assembling and disassembling apparatus 110.

Although cable 18 has been illustrated and described as the cutting element for severing apparatus 10, it is clear that a rigid device, such as a knife blade of any suitable configuration, may provide the cutting element for apparatus 10. Therefore, as used in this specification and the appended claims, the bight of the fall may include such a knife section. In this respect, a pair of such cables 18 would be utilized and coupled at spaced locations on the blade so as to effectively draw the same through column 28 in a manner to sever the same. Such being the case, the knife, if of sufficient dimensions, may provide a platform on which the severed column 28 rests so that the column may be lifted and moved to the site of replanting.

Having thus described the invention, what is claimed as new and desired to be secured by Letters Patent is:

1. Multiple purchase block and tackle structure for severing a column of earth comprising:
   a support;
   a standing block and a running block carried by said support, each provided with sheave means;
   a fall provided with a bight, a pair of running ends rove over said sheave means and secured to the support; and
   jack mechanism carried by the support and coupled with the running block for shifting the latter to haul on said fall, whereby to constrict said bight and thereby pull the latter through the column transversely thereof when said bight is looped around the column and said support is in engagement with the latter.

2. Multiple purchase block and tackle structure for severing a column of earth comprising:
   an extensible support having a base section and a vertically reciprocable section;
   a standing block carried by said base section;
   a running block carried by said reciprocable section;
   sheave means on each block respectively;
   a fall provided with a bight, a pair of running ends rove over said sheave means and secured to the support; and
   jack mechanism carried by the base section and connected with the reciprocable section for raising the latter to haul on said fall, whereby to constrict said bight and thereby pull the latter through the column transversely thereof when said bight is looped around the column and said base section is in engagement with the latter.

3. Multiple purchase block and tackle structure for severing a column of earth comprising:
   an extensible support having a base section and a vertically reciprocable section;
   a standing block carried by said base section;
   a running block carried by said reciprocable section;
   sheave means on each block respectively;
   a fall provided with a bight, a pair of running ends rove over said sheave means and secured to the support;
   jack mechanism carried by the base section and connected with the reciprocable section for raising the latter to haul on said fall, whereby to constrict said bight and thereby pull the latter through the column transversely thereof when said bight is looped around the column and said base section is in engagement with the latter; and
   a vertically extensible standard having a part rigid to said base section and a shiftable part carried by the rigid part, said mechanism being mounted on the shiftable part.

4. Multiple purchase block and tackle structure for severing a column of earth comprising:
   an extensible support having a base section and a vertically reciprocable section;
   a standing block carried by said base section;
   a running block carried by said reciprocable section;
   sheave means on each block respectively;
   a fall provided with a bight, a pair of running ends rove over said sheave means and secured to the support;
   jack mechanism carried by the base section and connected with the reciprocable section for raising the latter to haul on said fall, whereby to constrict said bight and thereby pull the latter through the column transversely thereof when said bight is looped around the column and said base section is in engagement with the latter, each of said sections having a pair of uprights, the uprights of the reciprocable section being telescoped in the uprights of the base sections; and
   a pair of spaced horns on each upright respectively of said base section adapted to receive the standing ends in coiled relationship thereto.

References Cited in the file of this patent

UNITED STATES PATENTS

| | | |
|---|---|---|
| 2,977,716 | Pearce | Apr. 4, 1961 |
| 2,988,393 | Logan | June 13, 1961 |
| 3,045,368 | Whitcomb | July 24, 1962 |